(12) United States Patent
Tanaka et al.

(10) Patent No.: US 8,740,608 B2
(45) Date of Patent: Jun. 3, 2014

(54) WORKPIECE REMOVAL AND FINISHING DEVICE

(75) Inventors: Norio Tanaka, Isesaki (JP); Atsushi Ikeda, Isesaki (JP); Takaaki Hoshi, Isesaki (JP)

(73) Assignee: Nihon Shoryoku Kikai Co., Ltd., Isesaki-shi (JP)

( * ) Notice: Subject to any disclaimer, the term of this patent is extended or adjusted under 35 U.S.C. 154(b) by 0 days.

(21) Appl. No.: 14/009,472

(22) PCT Filed: Apr. 2, 2012

(86) PCT No.: PCT/JP2012/058910
§ 371 (c)(1),
(2), (4) Date: Oct. 2, 2013

(87) PCT Pub. No.: WO2012/137725
PCT Pub. Date: Oct. 11, 2012

(65) Prior Publication Data
US 2014/0017352 A1    Jan. 16, 2014

(30) Foreign Application Priority Data

Apr. 5, 2011  (JP) ................................ 2011-083233

(51) Int. Cl.
*B29C 37/00* (2006.01)

(52) U.S. Cl.
USPC .................. 425/444; 264/334; 425/436 RM; 425/556

(58) Field of Classification Search
USPC .............. 425/436 RM, 444, 556; 414/222.07, 414/222.13, 225.01, 226.02, 226.04, 414/226.05, 751.1, 753.1, 763; 264/161, 264/162, 334, 344, 349
See application file for complete search history.

(56) References Cited

U.S. PATENT DOCUMENTS 4,449,914 A * 5/1984 Schmidts et al. ............. 425/556
4,781,571 A * 11/1988 Heindl et al. ................. 425/556
(Continued)

FOREIGN PATENT DOCUMENTS

JP    58-158209 A    9/1983
JP    61-35911 A     2/1986
(Continued)

OTHER PUBLICATIONS

International Search Report dated Apr. 24, 2012, issued in corresponding application No. PCT/JP2012/058910.
(Continued)

*Primary Examiner* — Dimple Bodawala
*Assistant Examiner* — Emmanuel S Luk
(74) *Attorney, Agent, or Firm* — Westerman, Hattori, Daniels & Adrian, LLP (57) ABSTRACT

There is provided a workpiece removal and finishing device that can easily, accurately, continuously and quickly perform a series of works for processing a workpiece of resin removed from a molding machine. The workpiece removal and finishing device for processing the workpiece of resin removed from the molding machine 41 has a workpiece removal robot 100 for directly or indirectly removing the workpiece from molds 2, 3, and a processing robot 200 for processing the workpiece. A processing tool which can profile the workpiece is secured to the arm tip of the processing robot 200 through a floating mechanism to be adaptable to thermal contraction of the workpiece, and the workpiece can processed by the profiling-capable processing tool provided to the arm tip 200A of the processing robot 200 while the workpiece removed by the workpiece removal robot 100 is positioned and held by the workpiece removal robot 100.

5 Claims, 12 Drawing Sheets

(56) References Cited

U.S. PATENT DOCUMENTS

| | | | |
|---|---|---|---|
| 5,273,418 A * | 12/1993 | Kato et al. | 425/186 |
| 6,260,899 B1 * | 7/2001 | Mankame | 294/86.4 |
| 6,711,457 B2 * | 3/2004 | Yanaka et al. | 700/213 |
| 7,244,093 B2 * | 7/2007 | Watanabe et al. | 414/806 |
| 7,281,916 B2 * | 10/2007 | Ito et al. | 425/34.1 |
| 7,442,030 B2 * | 10/2008 | Kinoshita et al. | 425/444 |
| 7,661,951 B2 * | 2/2010 | Huang | 425/556 |
| 8,007,268 B2 * | 8/2011 | Huang | 425/315 |
| 8,308,472 B2 * | 11/2012 | Heinz | 425/444 |
| 8,608,470 B2 * | 12/2013 | Ishibashi | 425/444 |
| 2002/0086085 A1 | 7/2002 | Takayama et al. | 425/556 |
| 2002/0105104 A1 * | 8/2002 | Adachi | 264/40.1 |
| 2003/0021861 A1 * | 1/2003 | Yamada | 425/308 |
| 2003/0152661 A1 * | 8/2003 | Yu et al. | 425/436 RM |
| 2004/0005372 A1 * | 1/2004 | Shirahata et al. | 425/135 |
| 2004/0119201 A1 * | 6/2004 | Burton et al. | 264/259 |
| 2004/0185136 A1 * | 9/2004 | Domodossola et al. | 425/547 |
| 2004/0247737 A1 * | 12/2004 | Ha et al. | 425/556 |
| 2005/0053687 A1 * | 3/2005 | Pitscheneder et al. | 425/190 |
| 2005/0196483 A1 * | 9/2005 | Kinoshita et al. | 425/444 |
| 2005/0202116 A1 * | 9/2005 | Kinoshita et al. | 425/444 |
| 2005/0276877 A1 * | 12/2005 | Nihei et al. | 425/444 |
| 2005/0276878 A1 * | 12/2005 | Nihei et al. | 425/444 |
| 2011/0193258 A1 * | 8/2011 | Tanaka et al. | 264/162 |

FOREIGN PATENT DOCUMENTS

| | | |
|---|---|---|
| JP | 05-57686 A | 3/1993 |
| JP | 2001-18238 A | 1/2001 |
| JP | 2003-33952 A | 2/2003 |
| JP | 2008-030251 A | 2/2008 |
| JP | 2008-273212 A | 11/2008 |
| JP | 2010-260313 A | 11/2010 |
| WO | 2007/039978 A1 | 4/2007 |
| WO | 2010/131308 A1 | 11/2010 |

OTHER PUBLICATIONS

Notification of Transmittal of Translation of the International Preliminary Report on Patentabililty (Form PCT/IB/338) of International Application No. PCT/JP2012/058910 mailed Oct. 17, 2013 with Forms PCT/IB/373 and PCT/ISA/237.

* cited by examiner

WORKPIECE REMOVAL AND FINISHING DEVICE

TECHNICAL FIELD

The present invention relates to a workpiece removal and finishing device that can easily and accurately perform a series of works for automatically performing removal and finishing processing on a workpiece molded by a molding machine.

BACKGROUND ART

It has been generally known in resin molding or the like that a molded workpiece is removed from a mold in a molding machine and then end materials, burr, etc. are removed from this workpiece by a processing tool, thereby obtaining a product. It has been hitherto general that a worker removes a workpiece from a mold in a molding machine and manually executes deburring, etc. on the workpiece, or a workpiece is set on a mold tool after the temperature of the workpiece decreases down to the normal temperature and the dimensional variation thereof settles, and then end materials, burr, etc. are removed by a cutting device having an ultrasonic cutter secured to a multi-joint robot (for example, see Patent Document 1) or the like.

PRIOR ART DOCUMENT

Patent Document

Patent Document 1: International Publication No. WO2007/039978

SUMMARY OF THE INVENTION

Problem to be Solved by the Invention

It has been executed in prior arts that a workpiece is removed from a mold and then mounted on a table or jig to be processed and finished as post-processes. However, this method increases a tact time and requires one mold tool to one product, so that the mold tool is expensive and tooling change (set-up change) of the mold tool is required. Furthermore, this method requires a specialized machine for cooling a molded article and processing the molded article after the dimensional variation thereof settles. This is because the workpiece just after molded thermally contracts and thus varies dimensionally with lapse of time, so that automation is difficult. Since products are finished by manual deburring or trimming, the quality of the products is unstable, and a trouble such as burn injury or the like occurs because manpower intervenes to a workpiece when the temperature of the workpiece is high. Likewise, when a manual work intervenes, it is necessary to interrupt the molding process using the mold due to a recess or the like. Therefore, a test shot for stabilizing products is required again, so that extra time and extra cost occur.

Therefore, an object of the present invention is to solve the problem of the prior art described above, and provide a workpiece removal and finishing device that can easily, accurately, continuously and quickly perform a series of works for removing a workpiece formed of resin from a molding machine and processing the thus-removed workpiece while holding the workpiece.

Means of Solving the Problem

According to the present invention, a workpiece removal and finishing device that processes a workpiece of resin removed from a molding machine is characterized by comprising a workpiece removal robot that directly or indirectly removes the workpiece from the molding machine, and a processing robot that processes the workpiece, wherein the processing robot processes the workpiece while the workpiece removal robot changes a processing position of the workpiece, a processing tool that is capable of profiling the workpiece is secured to an arm tip of the processing robot through a floating mechanism so as to be adaptable to thermal contraction of the workpiece, the workpiece removal robot moves a processing face of the workpiece to the processing robot, the workpiece removal robot is subjected to attitude control so that the workpiece is located at a position where the processing robot can easily process the workpiece, and the workpiece is processed by the processing tool which is provided to the arm tip of the processing robot to be capable of profiling while the workpiece removed by the workpiece removal robot is positioned and held by the workpiece removal robot.

According to the present invention, the workpiece removal robot removes the workpiece from the molding machine, and the workpiece is processed by the processing tool provided to the arm tip of the processing robot while the workpiece is positioned and held by the workpiece removal robot. In addition, the processing tool is configured to be capable of performing profiling processing in conformity with the thermal contraction of the workpiece through the floating mechanism. Therefore, even when the outer shape of the workpiece contracts due to thermal contraction, the workpiece can be processed, and a series of works for processing and finishing the workpiece of resin removed from the molding machine can be easily, accurately, continuously and quickly performed.

In this case, the molding machine may be a blow molding machine, the blow molding machine may be provided with a workpiece removal mechanism, and the workpiece fed by the removal mechanism may be received by the workpiece removal robot.

A product holder may be disposed along the removal mechanism, and the workpiece may be removed by the workpiece removal robot while the workpiece is held by the product holder.

The molding machine may be an injection molding machine, and the arm tip of the workpiece removal robot may intrude into the molding machine so that the workpiece removal robot removes the workpiece.

There may be further provided a mold tool on which the workpiece is mounted after a surface of the workpiece at the opposite side to a held surface of the workpiece held by the workpiece removal robot is processed by the processing robot, and the held surface may be processed by the processing robot while the workpiece is held by the mold tool.

A cutter blade may be secured to the arm tip of the processing robot, and vibrated by a vibrator so as to be capable of cutting a linear portion or a curved line portion of the workpiece.

End-material withdrawing means may be provided at a processing position of the workpiece by the processing robot, and product withdrawing means for the workpiece may be provided at a position different from the locating position of the end-material withdrawing means so that the workpiece is fed to the product withdrawing means by the workpiece removal robot after the workpiece is processed.

The end-material withdrawing means and the swarf withdrawing means may be provided in an overlap range between respective operation ranges of the workpiece removal robot and the processing robot, and end materials may be separately withdrawn in accordance with the sizes of the end materials.

Effect of the Invention

According to the present invention, the workpiece removal robot removes the workpiece from the molding machine, and the workpiece is processed by the processing tool provided to the arm tip of the processing robot while the workpiece is positioned and held by the workpiece removal robot. In addition, the processing tool is configured to be capable of profiling the workpiece through the floating mechanism in conformity with the thermal contraction of the workpiece. Therefore, even when the outer shape of the workpiece is contracted due to thermal contraction, the workpiece can be processed, and a series of works for processing the resin workpiece removed from the molding machine can be easily, accurately, continuously and quickly performed.

MODES FOR CARRYING OUT THE INVENTION

Embodiments according to the present invention will be described hereunder with reference to the accompanying drawings.

Figure 1:
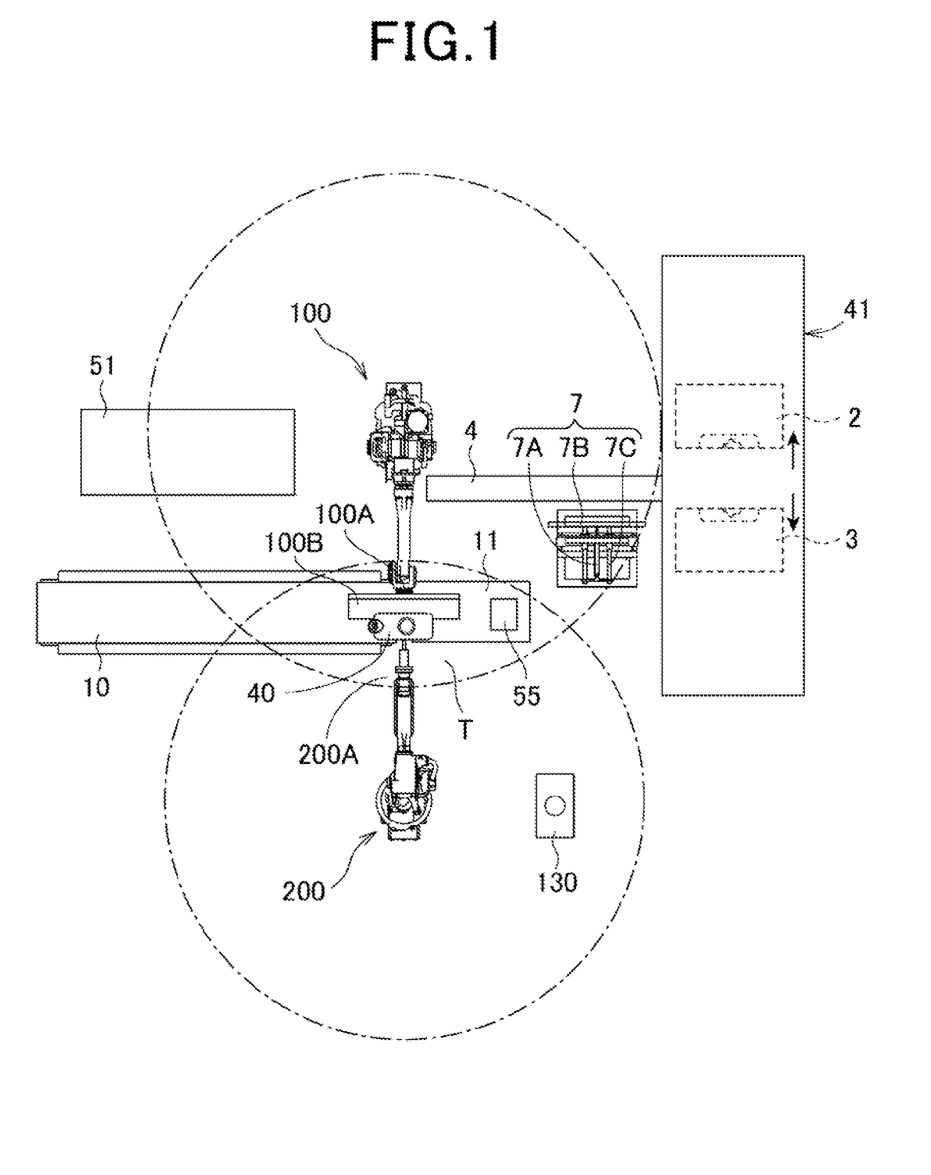
FIG. 1 is a plan view showing a workpiece removal and finishing device according to an embodiment.

FIG. 1 shows a workpiece removal and finishing device according to an embodiment.

In general, an article is called as a semi-product until finishing processing has been completed, and it is called as a completed product after the finishing processing has been completed. However, both the semi-product and the completed product are called as workpieces in this specification for the sake of convenience of description.

A workpiece removal and finishing device according to this embodiment is a device for performing deburring, trimming, boring, finishing, etc. on a resin workpiece removed from molds 2, 3 in a molding machine just after blow molding using a blow molding machine 41, and it comprises a workpiece removal robot 100 and a processing robot 200.

A workpiece removed from the molds 2, 3 in the molding machine is positioned and kept to be held by the workpiece removal robot 100, and processed by a processing tool secured to an arm tip 200A of the processing robot 200 just after the workpiece is subjected to blow molding.

The blow molding machine 1 has a pair of molds 2, 3 in the molding machine. Parison is filled in the pair of molds 2, 3, and air is blown into the parison, whereby a product is formed by blow molding. After the blow molding, the pair of molds 2, 3 are released from each other in the directions of arrows, and the workpiece is removed from the molds 2, 3 through a removal mechanism 4.

Figure 2:
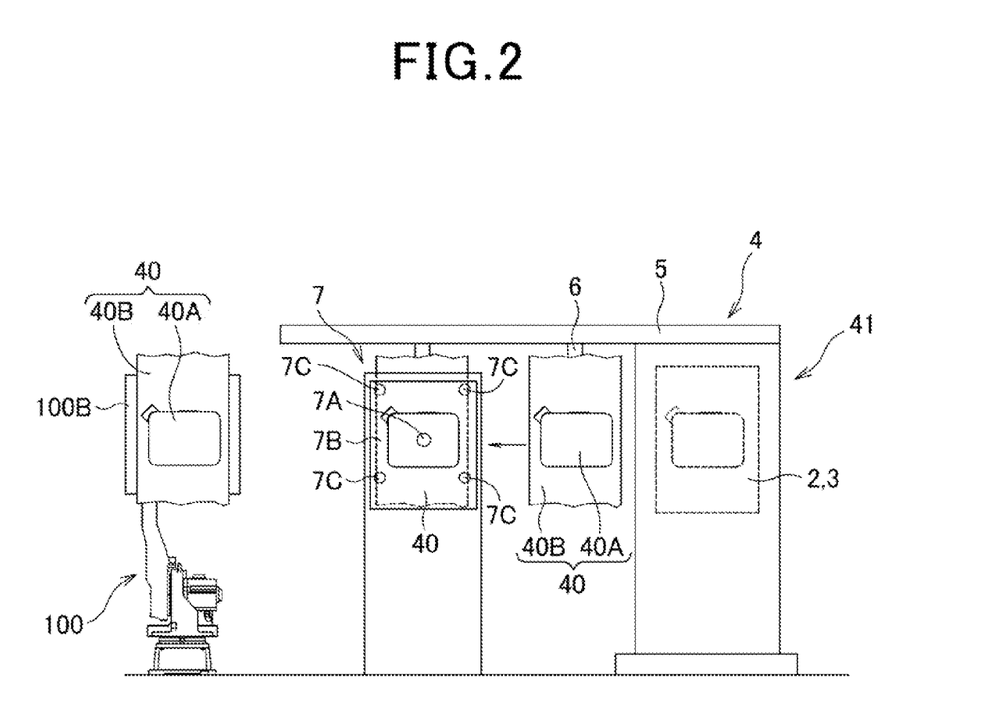
FIG. 2 is a side view of the workpiece removal and finishing device.

As shown in FIG. 2, the removal mechanism 4 is configured so that feeding means 6 driven by a chain or the like is hung from a rail 5 extending along the upper side of the pair of molds 2, 3, and a workpiece 40 is fed to the left side in FIG. 2 while suspended by the feeding means 6, for example. The workpiece 40 is under a high temperature state just after molded, and large burr 40B is formed along a partition line of the molds 2, 3 around a main body 40A which will become a product (for example, resin container). The workpiece 40 is fed while the burr 40B is suspended by the feeding means 6.

A product holder 7 is disposed along the removal mechanism 4. The product holder 7 comprises a cylinder 7A, a holding bar 7B fixed to the rod tip of the cylinder 7A, and plural guide rods 7C as shown in FIG. 1. When the workpiece 40 is suspended and fed to the position of the product holder 7 by the removal mechanism 4, the cylinder 7A is driven to make the holding bar 7B protrude, whereby the holding bar 7B is brought into contact with the workpiece 40.

Figure 3:
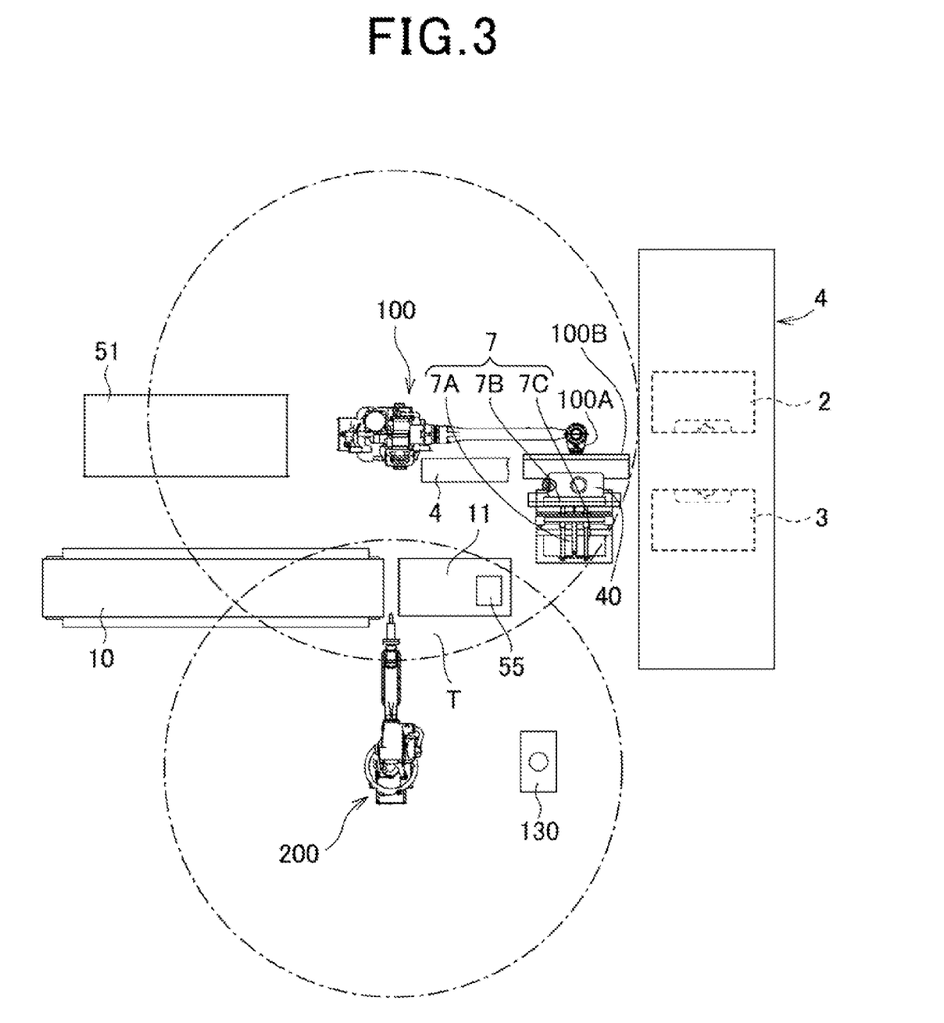
FIG. 3 is a diagram showing the operation of a workpiece removal robot.

Subsequently, as shown in FIG. 3, the workpiece removal robot 100 is driven so that the arm tip 100A thereof confronts the workpiece 40 located at the position of the product holder 7, and the workpiece 40 is sandwiched between an adsorption plate 100B at the arm tip 100A and the holding bar 7B and held while adsorbed by an adsorbing disc (not shown) of the adsorption plate 100B.

After the workpiece 40 is adsorbed and held by the adsorption plate 100B at the arm tip 100A, the workpiece removal robot 100 is driven to move the workpiece 40 to a workpiece processing position above an end-material conveyor (end-material withdrawing means) 10 or a swarf withdrawing box (swarf withdrawing means) 11 as shown in FIG. 1.

At this time, the workpiece 40 is moved while the surface thereof to be processed confronts the processing robot 200 described later so that the processing work of the processing robot 20 is facilitated.

The end-material conveyor 10 and the swarf withdrawing box 11 are disposed within the overlap range T between the respective operation ranges of the workpiece removal robot 100 and the processing robot 200. When the workpiece 40 is processed above the end-material conveyor 10, end materials drop onto the end-material conveyor 10, and are fed through the end-material conveyor 10 to a crusher (not shown), for example. Furthermore, when the workpiece 40 is processed above the swarf withdrawing box 11, end materials drop into the swarf withdrawing box 11. Large end materials are fed to the crusher (not shown) and subjected to end material processing. However, small swarf is withdrawn into the swarf withdrawing box 11 and processed because it may break the crusher (not shown).

In the workpiece removal and finishing device, the workpiece 40 is processed by the processing robot 200 under the state that the workpiece 40 is positioned by the workpiece removal robot 100 as described above. When the workpiece 40 is processed, the time does not so much elapse from the completion of the blow molding and thus the workpiece 40 is not cooled, so that the workpiece 40 is under a high temperature state.

Figure 4:
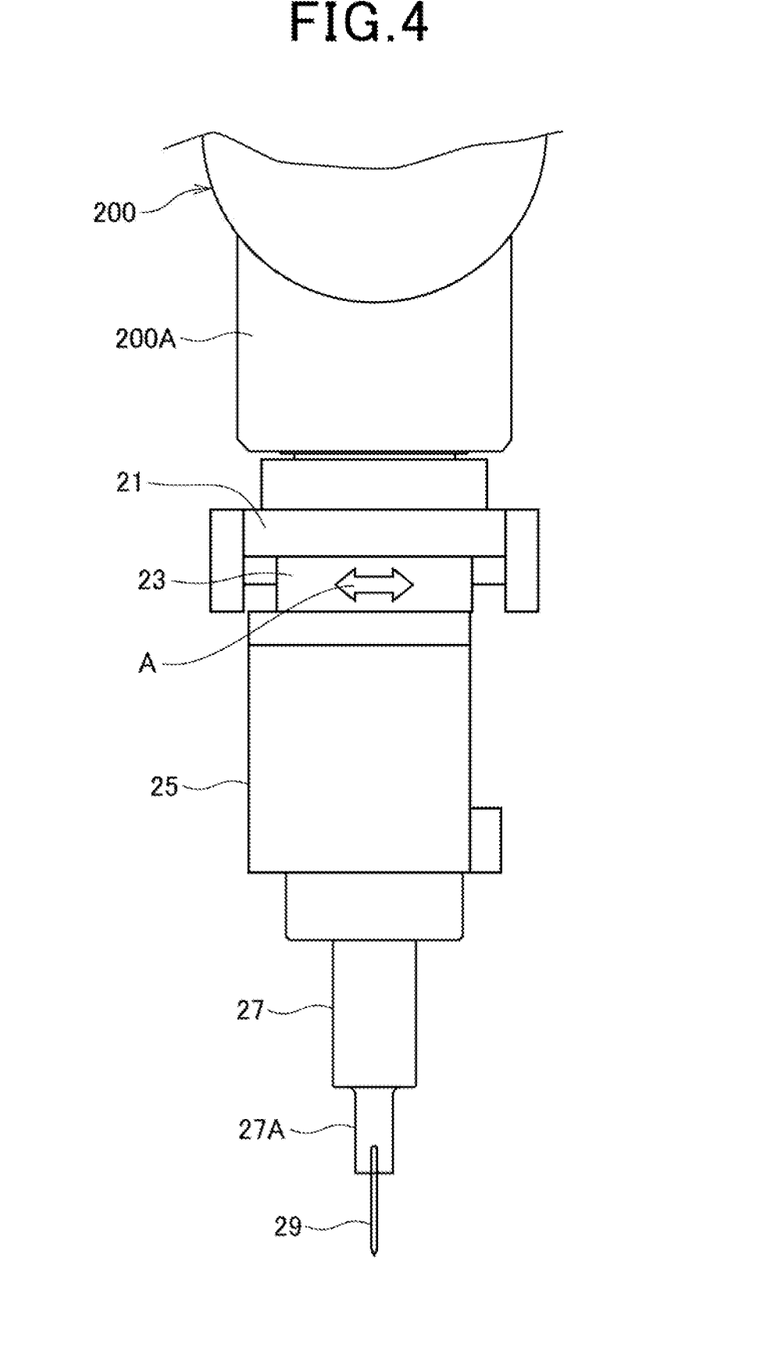
FIG. 4 is a side view showing a processing tool.
Figure 5:
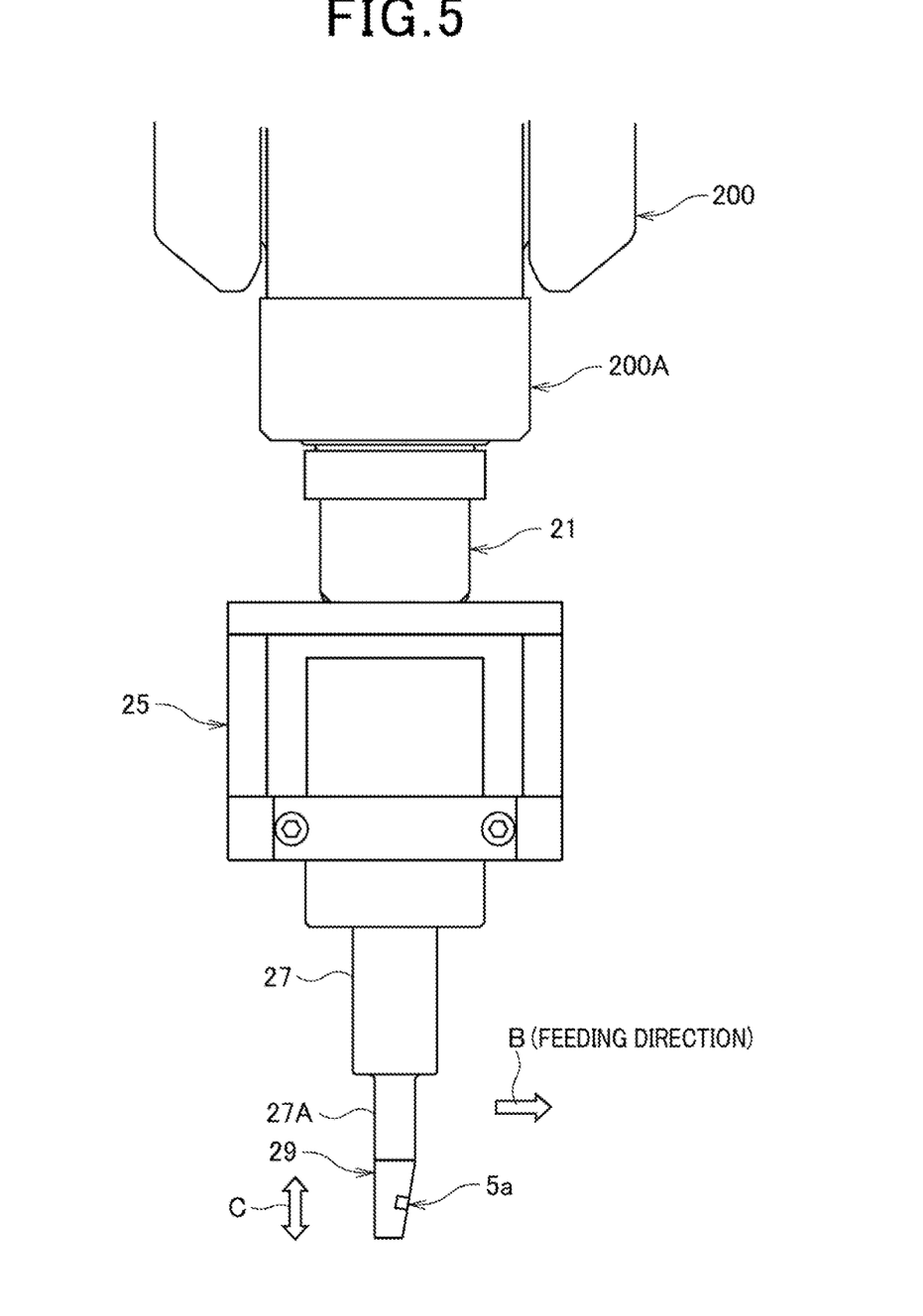
FIG. 5 is a front view showing the processing tool.

The processing robot 200 is a general hexaxial (6-axis) vertical multi-joint robot. As shown in FIGS. 4 and 5, an air-driven slide table 21 is secured to the arm tip 200A thereof, and the slide table 21 is provided with a slide unit 23. The slide unit 23 is configured as a floating mechanism which is positionally freely movable in the direction of an arrow A, that is, kept to be floated with respect to the workpiece 40 dependently on balance of air pressure applied to a pair of air supply ports (not shown).

The air pressure applied to each of the air supply ports (not shown) is independently controllable so as establish the balance in air pressure between both the air supply ports. When tool weight becomes a load due to tool attitude, the pressure to be applied to each air supply port can be automatically adjusted in accordance with the tool attitude so that the tool weight is canceled. An ultrasonic vibrator holder 25 is secured to the slide unit 23 which is kept to be floated with respect to the workpiece 40, and an ultrasonic vibrator 27 is secured to the ultrasonic vibrator holder 25.

As shown in FIG. 5, a cutter blade 29 is fixed to the tip of a support horn 27A of the ultrasonic vibrator 27. According to the vibration of the ultrasonic vibrator 27, the cutter blade 29 ultrasonically vibrates in a direction (the direction of an arrow C) which is substantially perpendicular to a feeding direction (the direction of an arrow B) of the cutter blade 29. An ultrasonic unit (not shown) is connected to the ultrasonic vibrator 27 to drive the ultrasonic vibrator 27. A vibrating body or a vibrating mechanism may be used in place of the ultrasonic vibrator 27.

Figure 6:
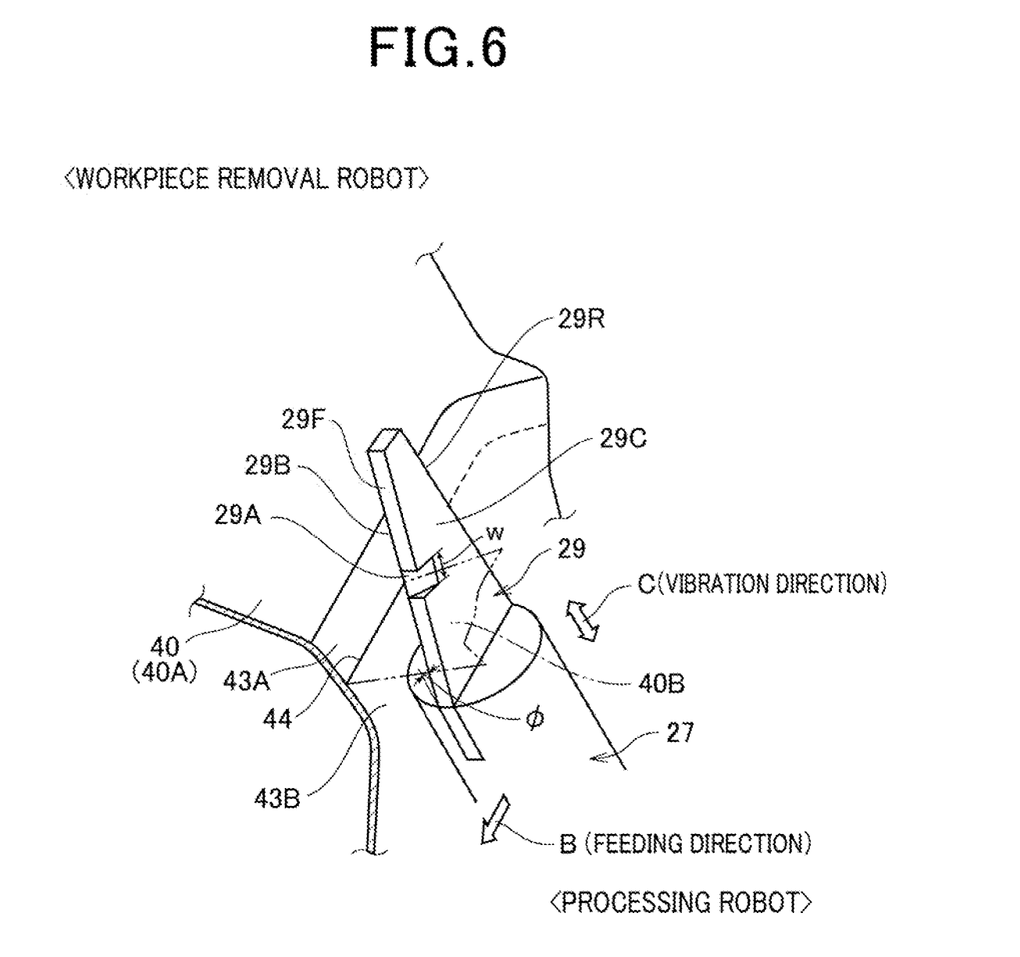
FIG. 6 is a perspective view showing the processing tool.

As shown in FIG. 6, the cutter blade 29 has a front end face 29F and a rear end face 29R, and comes into contact with the base portion (root) of burr 40B formed on a parting line 44 or the like of the workpiece 40 (for example, parts of a bed for nursing care, parts of a copying machine, a tool box, a keep-warm resin box, an air spoiler for a vehicle, interior parts for a vehicle, resin parts of home electric appliances, etc.).

In this case, the sweep-back angle $\phi$ of the front end face 10F is properly set, and it may be set to about 10°. The cutter blade 29 comprises a cutting blade portion 29A of about several millimeters in width which corresponds to the root of the burr 40B, and a profiling portion 29B having curved surfaces which correspond to respective surface portions 43A, 43B of the workpiece 40 and do not constitute the cutting blade. The cutting blade portion 29A and the profiling portion 29B are provided at the front end face 29F side of the cutter blade main body portion 29C. In this case, the width W of the cutting blade portion 29A is generally set to about 0.6 mm to 1 mm, and it may be properly changed in accordance with the shape of burr formed on the workpiece 40 or the like.

Referring to FIG. 1, a sensor 130 is disposed within the operation range of the processing robot 200. The sensor 130 comprises a touch sensor, for example. The sensor 130 is connected to a controller (not shown) of the processing robot 200, and the controller (not shown) instantaneously stops the processing robot 200 when a contact detection signal is input from the sensor 130 to the controller. In place of the touch sensor, the sensor 130 may be a sensor whose output varies in accordance with the amount of press.

The controller (not shown) controls the operation of the processing robot 200 according to a predetermined program so that the tool tip approaches to and comes into contact with the sensor 130, and also stores a reference coordinate of the tool in the predetermined program. Accordingly, the controller compares the actual coordinate of the tool tip with the reference coordinate to determine whether the displacement amount between the reference coordinate and the actual coordinate of the tool tip is within a permissible value or not every time the tool tip comes into contact with the sensor 130 and thus the processing robot 200 stops.

This reference coordinate is set to a coordinate of the tool tip when the sensor 130 detects the contact thereof with the tool tip and thus the processing robot 200 stops in a case where the processing robot 200 is operated according to the predetermined program just after the tool is exchanged, for example. Furthermore, the determination timing may be set so that the determination is performed at least once in a product processing cycle.

An alarm signal output device such as a lamp, a speaker or the like is connected to the controller (not shown), and when the displacement between the reference coordinate and the coordinate of the tool tip exceeds the permissible value, an alarm signal for promoting exchange of the tool is output.

Or, when the workpiece removal and finishing device has a tool automatic exchange device for automatically exchanging a cutting blade and the displacement between the reference coordinate and the coordinate of the tool tip exceeds the permissible value, the processing may be shifted to an operation of automatically exchanging the cutting blade.

In this embodiment, when the workpiece 40 is processed (for example, deburred) by the processing robot 200, the workpiece removal robot 100 positions and holds the workpiece 40 as shown in FIG. 1. That is, under the state that the workpiece removal robot 100 positions and holds the workpiece 40, the workpiece 40 is processed by a cutting blade 29 as a processing tool provided to the arm tip 200A of the processing robot 200 as shown in FIG. 6.

In this embodiment, the slide unit 23 under the floating state is provided to the arm tip 200A of the processing robot 200, and the cutter blade 29 is secured to the slide unit 23 through the ultrasonic vibrator holder 25 and the ultrasonic vibrator 27. Therefore, even when the shape of the workpiece 40 varies due to thermal contraction or the like, the cutter blade 29 is enabled to profile the shape variation of the workpiece 40 by the floating mechanism. Therefore, even the workpiece 40 which is removed from the molds 2,3 in the molding machine and kept under the high-temperature state just after the blow molding can be processed with high precision.

In this construction, the so-called processing tool is configured to be capable of performing profiling processing in accordance with the thermal contraction of the workpiece 40 by the floating mechanism. Therefore, even when the outer shape of the workpiece contracts due to thermal contraction, the workpiece can be processed, and a series of works for processing the workpiece 40 of resin which is removed from the molds 2, 3 can be easily, accurately and continuously performed in a short time.

A series of works of the workpiece removal robot 10 and the processing robot 200 are executed by a teaching to the hexaxial vertical multi-joint robot. As the teaching may be considered a direct teaching through which an operator actually moves the arm of the hexaxial vertical multi-joint robot once or several times to store route information corresponding to a moving route of the arm, or a route automatic generation system for automatically generating route information by using shape information created by a design system such as a CAD system or the like.

In the case of a resin molded article, the route information obtained by the direct teaching or the route automatic generation system does not necessarily represent an accurate route because workpieces 40 as actual processing targets are dispersed in size.

Particularly, the temperature of the workpiece 40 removed from the molds 2, 3 in the molding machine is very high as described above, and the processing robot 200 processes the workpiece 400 without cooling while the temperature of the workpiece 400 is kept high. Therefore, the workpiece 40 thermally contracts in the act of the processing. For example, thermal contraction of about 20 mm occurs in a workpiece of 700 mm in size, and thus a route for each workpiece cannot be necessarily made accurate due to this thermal contraction, etc.

In this embodiment, as described above, the processing robot 200 has the floating mechanism using the slide unit 23, and the profiling control is performed by the floating mechanism. Therefore, not only the contraction of the outer shape of the workpiece 40 caused by thermal contraction just after the resin molding, but also the "displacement" caused by dispersion of products can be absorbed, and the series of processing works based on the workpiece removal robot 100 and the processing robot 200 can be accurately and smoothly performed.

Furthermore, the attitudes of the workpiece removal robot 100 and the processing robot 200 vary sequentially. Therefore, even when the attitude of the cutter blade 29 with respect to the workpiece 40 varies, the cutting blade portion 29A does not bite into the workpiece 40 and the processing (deburring) can be accurately and smoothly performed because the profiling portion 29B is formed on the cutter blade 29. In prior arts, molds 2, 3 have been designed to be large in consideration of contraction allowance of resin products. Accordingly, from this point of view, when the processing robot 200 is subjected to teaching, the teaching may be performed in consideration of the contraction allowance of resin products.

When the contraction or deformation of the workpiece 40 is larger than allowable tolerance of the slide unit 23 or the like, the contraction or deformation of the workpiece 40 may be detected by a sensor or camera (not shown) to position the workpiece 40 within the range of the slide unit 23, whereby the profiling processing can be accurately and smoothly performed on the workpiece 40 without biting into the workpiece 40.

After the processing of the workpiece, the workpiece removal robot 100 is operated so that the workpiece 40 is fed from the workpiece processing position above the end-material conveyor 10 or the swarf withdrawing box 11 onto a product discharge chute 51, the adsorption of the workpiece 40 by the suction disc (not shown) of the adsorption plate 100B is released, and the workpiece 40 is dropped into the product discharge chute 51 and withdrawn as a product. Various product discharging manners can be proposed in connection with products. For example, when damage on the outer surface of a product is allowed, the product may be withdrawn by the product discharge chute 51. When products are managed while arranged in product returnable boxes, the workpiece removal robot 100 may directly arrange workpieces 40 in the product returnable boxes in a line.

When the series of workpiece processing works described above is finished, the workpiece removal robot 100 is set so that the workpiece 40 is removable therefrom, moves in the neighborhood of the product holder 7 along the removal mechanism 4, and waits until a next workpiece 40 is fed from the molds 2, 3 to a predetermined position while suspended by the removal mechanism 4 after a next molding cycle is completed.

The end materials contain mixture of large end materials or small end materials, minute chips, etc. Withdrawn end materials are frequently recycled in the resin processing, and the recycle manner of the resin end materials varies in accordance with the sizes of the resin end materials.

At this time, plural end-material conveyors 10 are disposed within the overlap range T between the operating ranges of the workpiece removal robot 100 and the processing robot 200. For example, when large end materials occur, the workpiece removal robot 100 which adsorbs the workpiece 40 is moved to a position above a first end-material conveyor (not shown), and the workpiece 40 is processed at the processing position above the first cutoff conveyor by the processing robot 200. When small end materials occur, the workpiece removal robot 100 is moved to a position above a second end-material conveyor (not shown), and the workpiece 40 is processed at the processing position above the second cutoff conveyor. When minute chips occur, the workpiece removal robot 100 is moved to a position above the swarf withdrawing box 11, and the workpiece 40 is processed at the processing position above the swarf withdrawing box 11 by the processing robot 200.

In this embodiment, the workpiece is processed by the processing robot 200 while the workpiece removal robot 100 holds the workpiece. Therefore, the processing position of the workpiece 40 can be easily changed to any position by moving each of the robots 100 and 200.

Accordingly, the workpiece is processed at the processing position above the end-material conveyor 10, whereby large end materials are fed to the end-material conveyor 10 and further fed to a crusher (not shown) to be subjected to end-material processing. In addition, minute chips are withdrawn into the swarf withdrawing box 11 and processed because minute chips may break the crusher (not shown), so that the end materials can be subjected to so-called separation collection.

When the end materials are cut off separately between the upper and lower portions of the workpiece 40 under the processing because the workpiece 40 is large, the cut-off end materials may be dropped while the workpiece 40 is rotated so that the cut-off end materials do not interfere with the arm of the workpiece removal robot 100.

At this time, the workpiece removal robot 100 and the processing robot 200 are subjected to attitude control at all times so that the workpiece 40 and the cutter blade 29 are located at positions where the workpiece 40 can be easily processed by the processing robot 200, whereby each of the workpiece removal robot 100 and the processing robot 200 is positioned within an optimum working range.

In the above construction, the workpiece removal robot 100 adsorbs and holds the workpiece 40, and thus the surface of the workpiece held (adsorbed) by the workpiece removal robot 100 cannot be processed by the processing robot 200.

In this case, the surface at the opposite side to the held surface (adsorbed surface) is first processed by the processing robot 200, and then the post-processing workpiece is fed onto a mold tool 55 (see FIG. 1) by the workpiece removal robot 100, and mounted on the mold tool 55. As shown in FIG. 1, the mold tool 55 is disposed, for example, inside the swarf withdrawing box 11 within the overlap range T. The mold tool 50 has a hollow body. As not shown, an adsorption hole is formed in the surface thereof, and the workpiece 40 is mounted on the surface of the mold tool 50 through a packing for preventing leakage of air, whereby the workpiece 40 is sucked from the adsorption hole (not shown) and fixed on the mold tool 55.

The held surface (adsorbed surface) of the workpiece 40 can be processed by the processing robot 200 while the workpiece 40 is fixed to the mold tool 55. The end materials in this processing are withdrawn through the swarf withdrawing box 11 (or the end-material conveyor 10).

Figure 7:
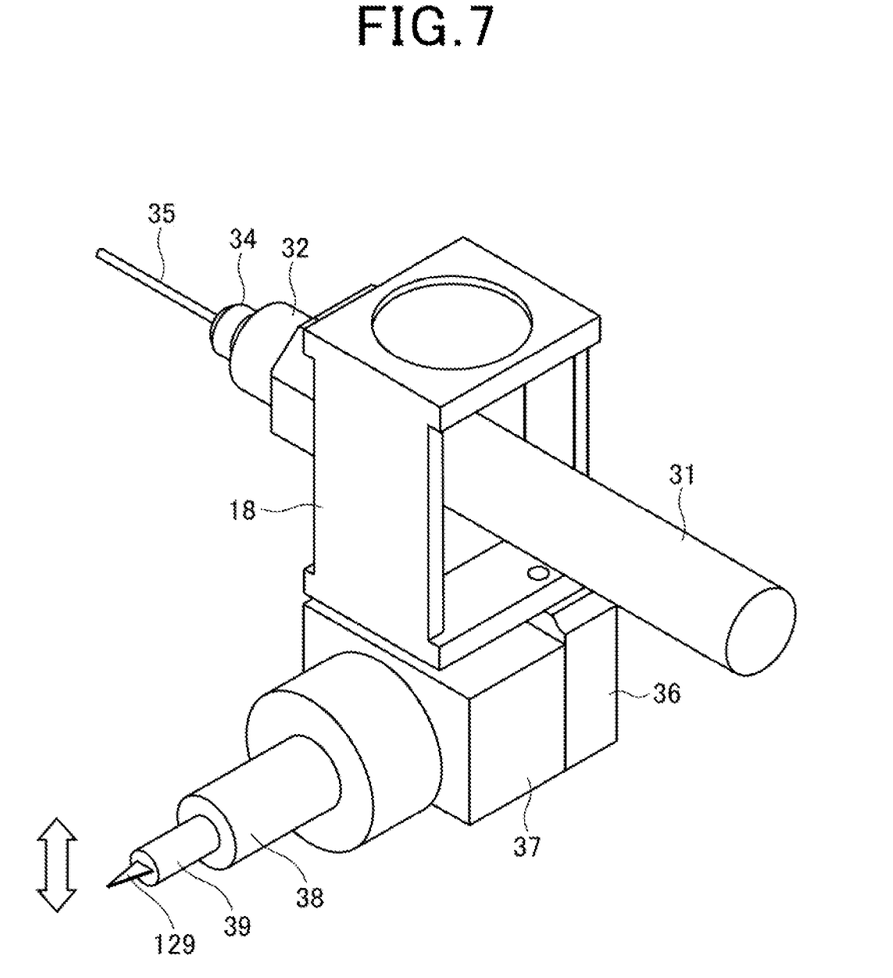
FIG. 7 is a perspective view showing a processing tool according to another embodiment.

FIG. 7 shows another embodiment of the processing tool.

The securing state of this processing tool is omitted from illustration, but the processing tool is secured to the arm tip 200A of the processing robot 200. This processing tool has a connection arm 18, and a spindle unit 31 is fixed to the connection arm 18. This spindle unit 31 has a main shaft (spindle) 32, a chuck 34 is secured to the tip of the main shaft 32, and an end mill 35 is secured to the chuck 34. The main shaft 32 contains a main shaft motor, and the main shaft motor is a motor which can obtain the maximum number of revolution of 20,000 rpm or more although it is small in diameter and light in weight. Particularly, a high-frequency motor which can rotate at an ultrafast speed of 40,000 to 80,000 rpm is preferably used. Furthermore, an ultrasonic vibration device 37 is secured to the connection arm 18 through a support block 36. The ultrasonic vibration device 37 has an ultrasonic vibrator 38 and a support horn 39, and a cutter blade 129 which is configured to have substantially the same construction as described above. A cutting blade portion and a profiling portion (not shown) are integrally formed in the cutter blade 129.

In the processing of the molded article, the cutter blade 129 performs linear trimming, trimming along a curved line having a small curvature (containing a three-dimensional curved line), and formation of a bore having a predetermined diameter or more (8 mm or more in diameter). Furthermore, the end mill 35 is an end mill of about 2 mm in diameter which is adaptable to form various bores, for example, and it is configured to have a large positive rake angle so that the cutting performance thereof is enhanced and cutting resistance and cutting heat can be suppressed. Furthermore, the end mill 35 may be designed to have a reverse lead (upper helix lead) configuration so that swarf is discharged in the direction to the tip thereof. In the processing of the molded article, the end mill 35 performs trimming along a curved line having a large curvature and forms a hole having a diameter less than a predetermined diameter (less than 8 mm in diameter). When the curvature is large, cutter breaking is liable to occur in the cutter blade 26, and thus it is difficult to perform trimming along a curved line having a large curvature and form a hole having a diameter less than a predetermined value (less than 8 mm in diameter).

The processing tool described above is not limited to those processing tools shown in FIGS. 4, 5 and 7. For example, the processing tool may be an end mill having a profiling portion (s) which has been filed as a patent application and publicly opened by the applicant of this application, a chamfering tool which is operated by a robot while a scraper is pressed against the surface of a workpiece at a negative rake angle, etc. These tools can finish the workpiece with high precision without biting into the workpiece 40 when the workpiece 40 is processed by the processing robot 200 while the workpiece 40 is positioned by the workpiece removal robot 100.

Figure 8:
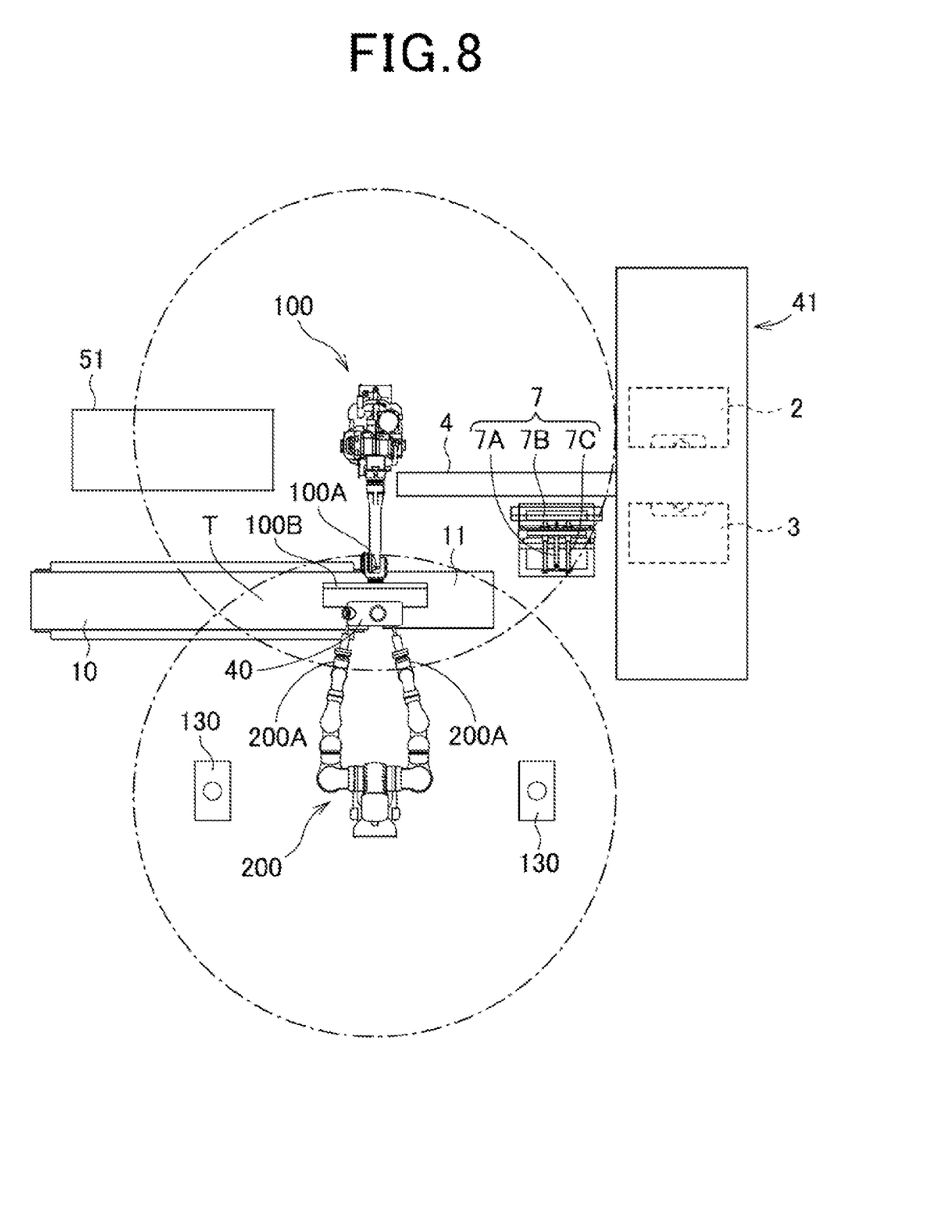
FIG. 8 is a plan view showing a workpiece removal and finishing device according to another embodiment.

FIG. 8 shows another embodiment. In FIG. 8, the same parts as shown in FIGS. 1 to 3 are represented by the same reference numerals, and the description thereof is omitted. According to this embodiment, the processing robot 200 is constructed by a composite type multi-joint working robot. The processing robot 200 is a double arm type robot, and constructed by integrally assembling two robots functioning independently of each other. The respective operations thereof can be controlled in an integrated fashion. For example, when the processing time of the processing robot 200 is long because a workpiece is large whereas the molding cycle time of the molding machine is short, plural processing robots are arranged to perform a cooperative work, whereby a so-called processing work compatible with the molding cycle of the molding machine can be performed. With this construction, the processing speed can be enhanced in conformity with the molding cycle of the workpiece.

Figure 9:
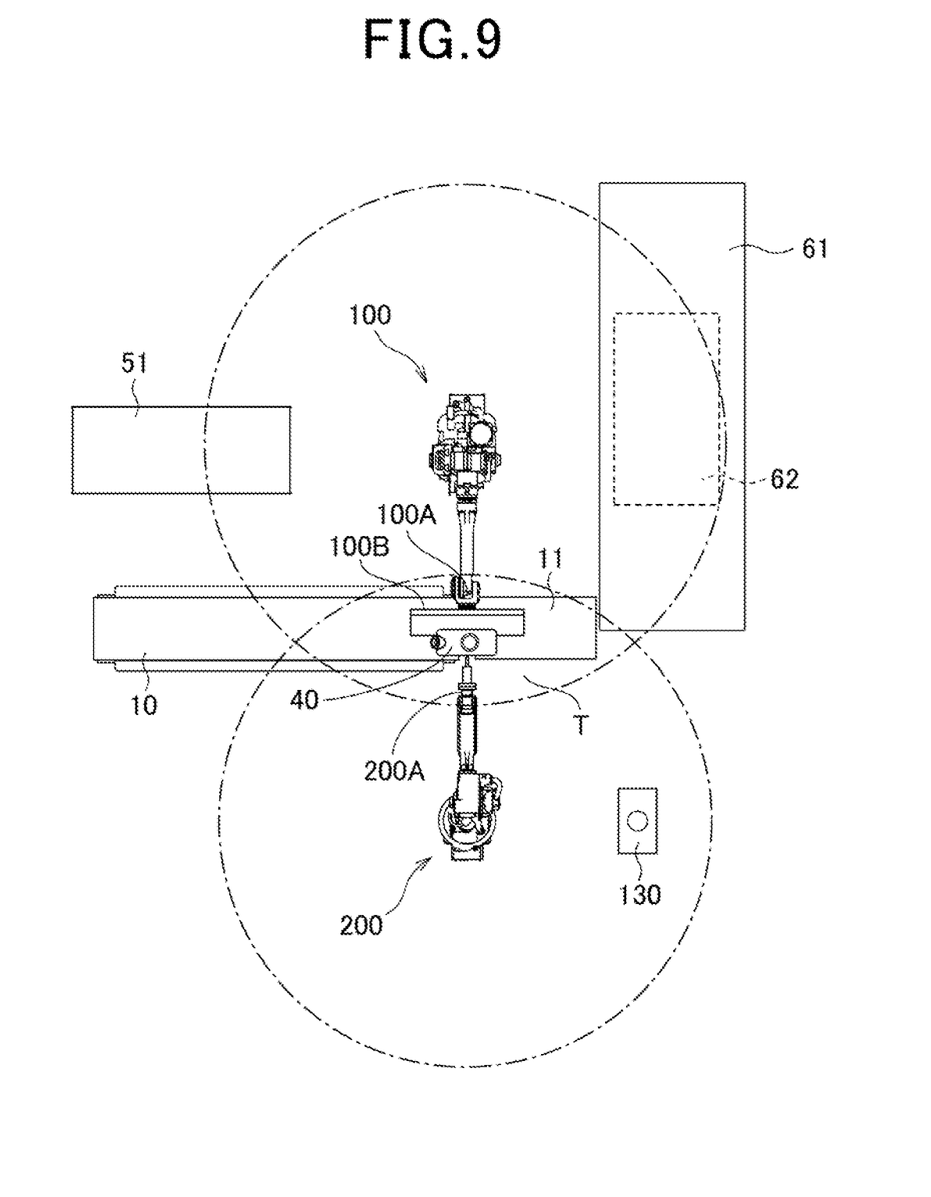
FIG. 9 is a plan view showing a workpiece removal and finishing device according to another embodiment.
Figure 10:
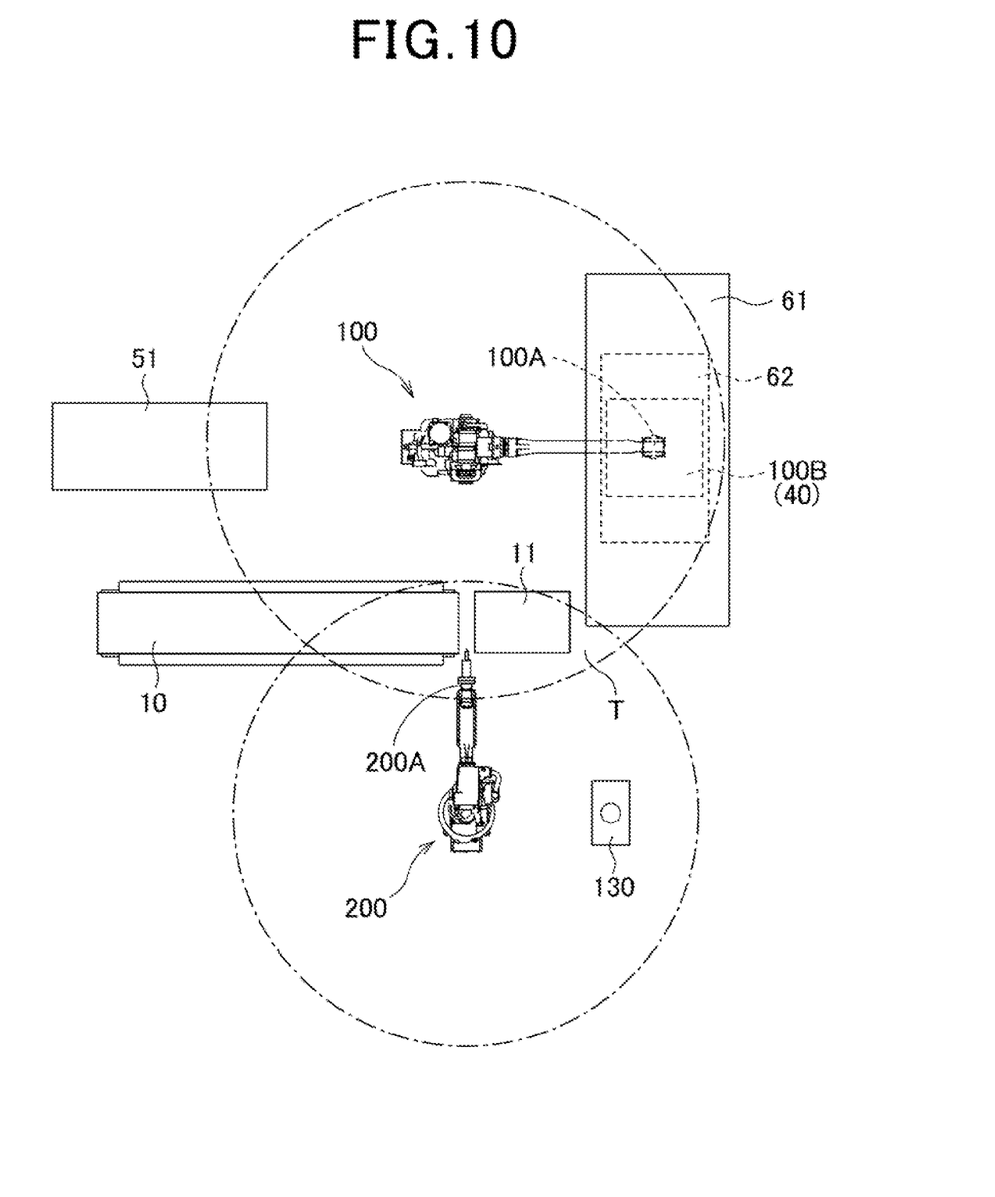
FIG. 10 is a diagram showing the operation of the workpiece removal robot.

FIG. 9 shows another embodiment. In FIG. 9, the same parts as shown in FIGS. 1 to 3 are represented by the same reference numerals, and the description thereof is omitted. In this embodiment, a workpiece is directly removed from a mold 62 by the workpiece removal robot 100. The mold 62 is configured to be divided into upper and lower molds. When resin injection molding is completed, the upper mold is upwardly separated from the lower mold, and the workpiece (molded article) remains at the lower mold side. The workpiece may be pushed up by an eject pin (not shown). Under this state, the arm tip 100a of the workpiece removal robot 100 intrudes into the gap between the upper mold and the lower mold as shown in FIG. 10, and the workpiece is adsorbed and held by an adsorption plate 100B of the arm tip 100a.

The workpiece removal robot 100 is operated to feed the workpiece to the processing position above the end-material conveyor 10, and the workpiece is processed at the processing position by the processing robot 200 in the same manner as the above embodiment.

Figure 11:
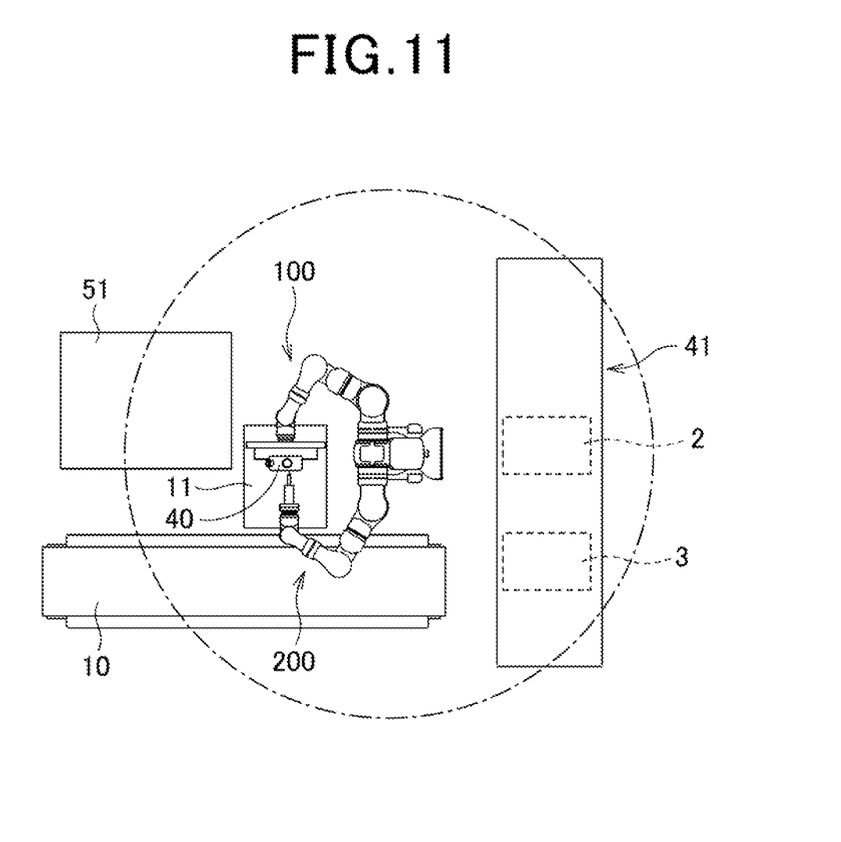
FIG. 11 is a plan view showing a workpiece removal and finishing device according to another embodiment.

FIG. 11 shows another embodiment. In FIG. 11, the same parts as shown in FIGS. 9 and 10 are represented by the same reference numerals, and the description thereof is omitted. This embodiment will be described as a device for performing deburring, trimming and boring on the workpiece 40 of resin removed from the molds 2, 3 after the blow molding of the blow molding machine 41.

In this construction, the workpiece removal robot 100 and the processing robot 200 are constructed by a composite type multi-joint working robot. In the example shown in FIG. 11, the workpiece 40 held by the workpiece removal robot 100 is processed at the processing position above the swarf withdrawing box 11 by the processing robot 200, and swarf drops into the swarf withdrawing box 11.

This composite type multi-joint robot sets the processing position to not only a position above the swarf withdrawing box 11, but also a position above the end-material conveyor 10. At this time, the end materials drop onto the end-material conveyor 10, and are fed to the crusher (not shown) to be subjected to the end-material processing.

Figure 12:
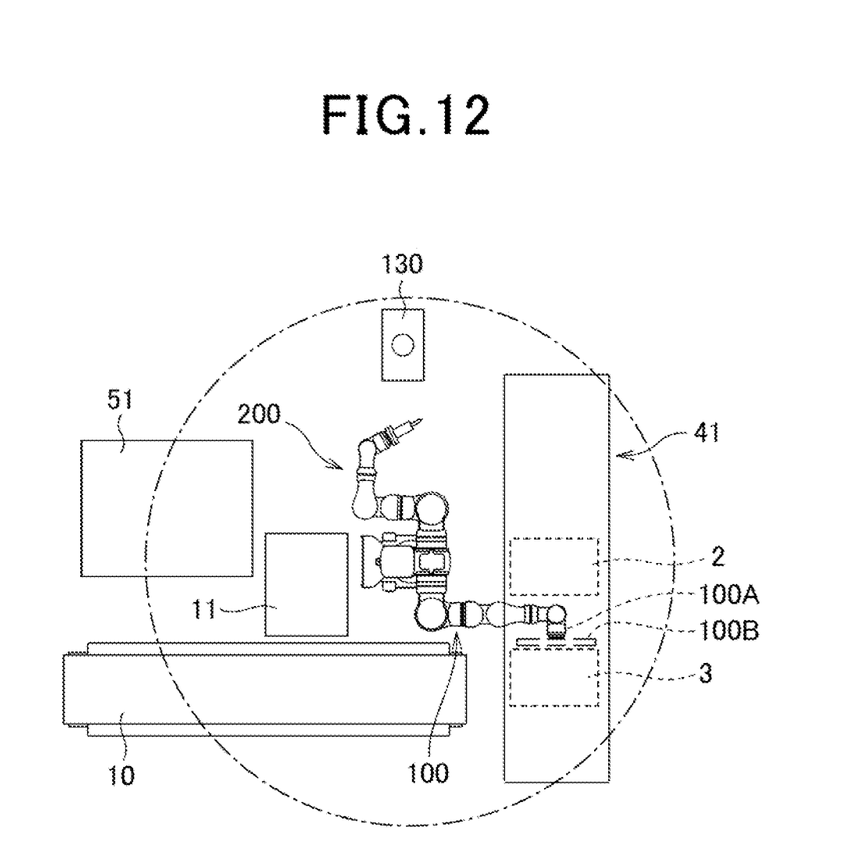
FIG. 12 is a diagram showing the operation of the workpiece removal robot.

In the blow molding machine 1, parison is filled in the pair of molds 2, 3, and air is blown into the parison, whereby a product is formed by blow molding. After the blow molding, the pair of molds 2, 3 are released, and the arm tip 100A of the workpiece removal robot 100 intrudes into the gap between the molds 2 and 3 as shown in FIG. 12, whereby the workpiece 40 is directly adsorbed and held by the adsorption plate 100B. Thereafter, as shown in FIG. 11, the workpiece removal robot 100 feeds the workpiece 40 to the workpiece processing position above the swarf withdrawing box 11 (or the end-material conveyor 10). At this time, the workpiece processing face is fixed to confront the processing robot 200 so that the processing work of the processing robot 200 can be facilitated. At this processing position, the processing is executed in the same procedure as described above by the processing robot 200.

In this embodiment, the workpiece removal robot 100 and the processing robot 200 are constructed by the composite type multi-joint working robot. Therefore, the workpiece is processed within the operation range of the working robot, and thus the working space can be saved.

DESCRIPTION OF REFERENCE NUMERALS 2, 3 mold
4 removal mechanism
7 product holder
10 end-material conveyor
11 swarf withdrawing box
T overlap range
40 workpiece
41 blow molding machine 55 mold tool
61 injection molding machine
100 workpiece removal robot
200 processing robot

The invention claimed is:

1. A workpiece removal and finishing device that processes a workpiece of resin removed from a molding machine, comprising:
    a workpiece removal robot that directly or indirectly removes the workpiece from the molding machine; and
    a processing robot that processes the workpiece, wherein
    the processing robot processes the workpiece while the workpiece removal robot changes a processing position of the workpiece,
    a processing tool that is capable of profiling the workpiece is secured to an arm tip of the processing robot through a floating mechanism so as to be adaptable to thermal contraction of the workpiece,
    the workpiece removal robot moves a processing face of the workpiece to the processing robot,
    the workpiece removal robot is sequentially subjected to attitude control so that the workpiece is located at a position where the processing robot can easily process the workpiece, and
    the workpiece can be processed by the processing tool which is provided to the arm tip of the processing robot to be capable of profiling while the workpiece removed by the workpiece removal robot is positioned and held by the workpiece removal robot.

2. The workpiece removal and finishing device according to claim 1, wherein the molding machine has a removal mechanism that removes the workpiece from a mold, and the workpiece removal robot receives the workpiece fed by the removal mechanism.

3. The workpiece removal and finishing device according to claim 2, wherein a product holder is disposed along the removal mechanism, and the workpiece removal robot removes the workpiece while the workpiece is held by the product holder.

4. The workpiece removal and finishing device according to claim 1, further comprising a mold tool on which the workpiece is mounted after a surface of the workpiece at the opposite side to a held surface of the workpiece held by the workpiece removal robot is processed by the processing robot, wherein the held surface is processed by the processing robot while the workpiece is held by the mold tool.

5. The workpiece removal and finishing device according to claim 1, further comprising end material withdrawing means located at a processing position of the workpiece by the processing robot, and product withdrawing means for the workpiece at a position different from the locating position of the end material withdrawing means, wherein the workpiece is fed to the product withdrawing means by the workpiece removal robot after the workpiece is processed.

* * * * *